United States Patent [19]

Abe et al.

[11] Patent Number: 5,189,103
[45] Date of Patent: Feb. 23, 1993

[54] POLYPHENYLENE ETHER RESIN COMPOSITION AND PROCESS FOR PRODUCING THE SAME

[75] Inventors: Hiroomi Abe, Chiba; Kenji Nagaoka; Takashi Sanada, both of Ichihara, all of Japan

[73] Assignee: Sumitomo Chemical Company, Limited, Osaka, Japan

[21] Appl. No.: 665,958

[22] Filed: Mar. 8, 1991

Related U.S. Application Data

[63] Continuation-in-part of Ser. No. 622,772, Dec. 5, 1990, abandoned.

[30] Foreign Application Priority Data

Dec. 11, 1989 [JP] Japan .................................. 1-321148

[51] Int. Cl.⁵ ............................................ C08L 71/12
[52] U.S. Cl. ...................................... 525/133; 525/132; 525/391; 525/392; 525/393; 525/396; 525/397; 525/905
[58] Field of Search ............... 525/133, 391, 392, 397, 525/905, 132, 393, 396

[56] References Cited

U.S. PATENT DOCUMENTS 4,888,397 12/1989 van der Meer et al. ............ 525/132
4,914,153 4/1990 Togo et al. .......................... 525/397

FOREIGN PATENT DOCUMENTS 63-128056 5/1988 Japan .

Primary Examiner—James J. Seidleck
Assistant Examiner—Thomas Hamilton, III
Attorney, Agent, or Firm—Stevens, Davis, Miller & Mosher

[57] ABSTRACT

A resin composition prepared by melting and kneading (A) a polyphenylene ether resin, (B) a polyolefin resin and (D) a functional compound simultaneously having (i) non-aromatic carbon-carbon multiple bond(s) and (ii) at least one functional group selected from the group consisting of substituted carboxyl groups, substituted hydroxyl groups, substituted amino groups, substituted silyl groups, substituted mercapto groups, substituted sulfonic acid groups and oxirane groups, or by melting and kneading (A) a polyphenylene either resin, (B) a polyolefin resin, (C) an elastomer and (D) a functional compound as mentioned above.

17 Claims, No Drawings

POLYPHENYLENE ETHER RESIN COMPOSITION AND PROCESS FOR PRODUCING THE SAME

CROSS REFERENCE TO RELATED APPLICATIONS

This application is a continuation-in-part of U.S. patent application Ser. No. 622,772 filed Dec. 5, 1990, now abandoned, the entire disclosure of which is herein incorporated by reference.

BACKGROUND OF THE INVENTION

This invention relates to a resin composition and a process for producing the same, and more particularly to a resin composition comprising a polyphenylene ether resin and a polyolefin resin as its main ingredients and having enhanced mechanical properties, particularly impact resistance, and a process for producing said resin composition.

DESCRIPTION OF THE PRIOR ART

Although polyphenylene ether resin is a useful resin excellent in mechanical properties, electrical properties and heat resistance, it has a fault that it is inferior in moldability and solvent resistance. Thus, at the present stage, the use of polyphenylene ether resin itself is much limited.

On the other hand, polyolefin resins and particularly crystalline polyolefin resins are characterized by their low density and inexpensiveness in addition to their excellent moldability and solvent resistance, and therefore they are extensively used practically as various molded articles and films. However, such polyolefin resins still have a fault that they are low in heat resistance, and this fault greatly obstructs a further extension of the use of polyolefin resins.

Under the above-mentioned situation, it is industrially valuable to blend together a polyphenylene ether resin and a polyolefin resin, both having their respective excellent characteristic feature, to produce a resin composition retaining the advantageous points of both the resins. Thus, a resin composition comprising a polyolefin resin and a polyphenylene ether resin has already been proposed in Japanese Patent Application Kokoku (Post-Exam.) No. 42-7069, Japanese Patent Application Kokai (Laid-Open) No. 2-115248), etc.

Generally speaking, however, polyphenylene ether resin and polyolefin resin are mutually poor in affinity, and a mere blending of them cannot give a sufficiently compatible mixture.

As a resin composition overcoming such a disadvantage, a resin composition comprising an acid-modified polyolefin resin and a polyphenylene ether resin [Japanese Patent Application Kokai (Laid-Open) No. 60-120748], a resin compositon conmprising a modified polyolefin resin and a modified polyphenylene ether resin [Japanese Patent Application Kokai (Laid-Open) No. 63-128056], etc. have been proposed.

However, these resin compositions hitherto proposed are yet insufficient in compatibility, and they are unsatisfactory in mechanical properties such as impact resistance, etc., though they are improved in solvent resistance, moldability, etc.

SUMMARY OF THE INVENTION

It is an object of this invention to provide a resin composition comprising a polyphenylene ether resin characterized by its excellent heat resistance and a polyolefin resin characterized by its excellent solvent resistance, economicity, etc. as its main constituent resin ingredients and having excellent mechanical properties, particularly impact resistance, and a process for producing the resin composition.

With the aim of achieving the above-mentioned object, the present inventors conducted elaborated studies to find that, if a polyphenylene ether resin and a polyolefin resin are melted and kneaded together in the presence of a specified unsaturated compound, there is obtained a resin composition remarkably enhanced in the extent of compatibility as compared with the case of above-mentioned Japanese Patent Application Kokai (Laid-Open) No. 63-128056 where the two resins were separately modified and the resulting modified products were melted and kneaded together. Based on the finding, this invention was accomplished.

Thus, the present invention provides a resin composition prepared by melting and kneading (A) a polyphenylene ether resin, (B) a polyolefin resin and optionally (C) an elastomer and (D) a functional compound simultaneously having (i) non-aromatic carbon-carbon multiple bond(s) and (ii) at least one functional group selected form the group consisting of substituted carboxyl group(s), substituted hydroxyl group(s), substituted amino group(s), substituted silyl group(s), substituted mercapto group(s), substituted sulfonic acid group(s) and oxirane group(s). This invention further provides a process for producing a resin composition which comprises melting and kneading (A) a polyphenylene ether resin, (B) a polyolefin resin and optionally (C) an elastomer and (D) a functional compound simultaneously having (i) non-aromatic carbon-carbon multiple bond(s) and (ii) at least one functional group selected from the group consisting of substituted carboxyl group(s), substituted hydroxyl group(s), substituted amino group(s), substituted silyl group(s), substituted mercapto group(s), substituted sulfonic acid group(s) and oxirane group(s).

DETAILED DESCRIPTION OF THE INVENTION

The term "polyphenylene ether resin (A)" used in this invention means a polymer constituted of a recurring unit represented by the following general formula:

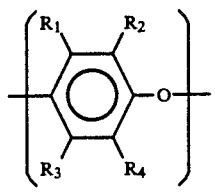

wherein $R_1$, $R_2$, $R_3$ and $R_4$ each represents identical or different group selected from the group consisting of hydrogen atom, halogen atom, hydrocarbon group, substituted hydrocarbon group, hydrocarbon-oxy group and substituted hydrocarbon-oxy group. Examples of the substituent in the substituted hydrocarbon group and substituted hydrocarbon-oxy group include thermally stable groups such as halogen atom, hydroxyl group, amino group, nitro group, cyano group, ester group, amido group, ether group, sulfide group, sulfone group and the like.

Concrete examples of said polyphenylene ether resin include poly(2,6-dimethyl-1,4-phenylene ether), poly(2,6-diethyl-1,4-phenylene ether), poly(2-methyl-6-ethyl-1,4-phenylene ether), poly(2-methyl-6-propyl-1,4-phenylene ether), poly(2,6-dipropenyl-1,4-phenylene ether), poly(2-ethyl-6-propyl-1,4-phenylene ether), poly(2,6-dibutyl-1,4-phenylene ether), poly(2,6-dipropenyl-1,4-phenylene ether), poly(2,6-dilauryl-1,4-phenylene ether), poly(2,6-diphenyl-1,4-phenylene ether), poly(2,6-dimethoxy-1,4-phenylene ether), poly(2,6-diethoxy-1,4-phenylene ether), poly(2-methoxy-6-ethoxy-1,4-phenylene ether), poly(2-ethyl-6-stearyloxy-1,4-phenylene ether), poly(2-methyl-6-phenyl-1,4-phenylene ether), poly(2-methyl-1,4-phenylene ether), poly(2-ethoxy-1,4-phenylene ether), poly(2-chloro-1,4-phenylene ether), poly(3-methyl-6-t-butyl-1,4-phenylene ether), poly(2,6-dichloro-1,4-phenylene ether), poly(2,5-dibromo-1,4-phenylene ether), poly(2,6-dibenzyl-1,4-phenylene ether), and various copolymers having plural kinds of recurring units constituting these polymers. The copolymers also include copolymers formed between poly-substituted phenols such as 2,3,6-trimethylphenol, 2,3,5,6-tetramethylphenol and the like and 2,6-dimethylphenol, and the like. The "polyphenylene ether resin" referred to in this invention also includes graft-modified products of polyphenylene ether resin prepared by graft-modifying the above-mentioned polyphenylene ether resins with a styrene type monomer such as styrene, alpha-methylstyrene and the like. Among these polyphenylene ether resins, poly(2,6-dimethyl-1,4-phenylene ether) and 2,6-dimethylphenol/2,3,6-trimethylphenol copolymer are preferable.

Although molecular weight of the polyphenylene ether resin usable in this invention cannot be simply specified because desirable molecular weight varies depending on the purpose, it is usually 0.1 to 0.7 dl/g and preferably 0.2 to 0.6 dl/g, as expressed in terms of intrinsic viscosity measured in chloroform at 30° C.

The process for producing such polyphenylene ether resins is well known and mentioned in, for example, U.S. Pat. Nos. 3,306,874, 3,306,875, and 3,257,357; Japanese Patent Application Kokoku (Post-Exam.) No. 52-17880, Japanese Patent Application Kokai (Laid-Open) Nos. 50-51197 and 1-304119, etc.

The term "polyolefin resin (B)" used in this invention inclusively means homopolymers and copolymers of olefins including alpha-olefins such as ethylene, propylene, butene-1, pentene-1, hexene-1, 3-methylbutene-1,4-methylpentene-1, octene-1, decene-1, dodecene-1, tetradecene-1, hexadecene-1, hexadecene-1, octadecene-1, eicosene-1 and the like, cyclic olefins mentioned in Japanese Patent Application Kokai (Laid-Open) No. 2-115248, and the like. Copolymers prepared by copolymerizing an olefin with a small quantity of other unsaturated monomer, and modified products of said copolymers and the above-mentioned olefin homopolymers and copolymers prepared by oxidation, halogenation, sulfonation and the like of polymer are also included in the polyolefin resin of this invention.

Examples of the above-mentioned unsaturated monomer copolymerizable with an olefin include unsaturated organic acids and their derivatives such as acrylic acid, methacrylic acid, maleic acid, itaconic acid, methyl acrylate, methyl methacrylate, maleic anhydride, arylmaleic acid imide, alkylmaleic acid imide and the like; vinyl esters such as vinyl acetate, vinyl butyrate and the like; aromatic vinyl compounds such as styrene, methylstyrene and the like; vinylsilanes such as vinyltrimethylmethoxysilane, γ-methacryloyloxypropyltrimethoxysilane and the like; non-conjugated dienes such as dicyclopentadiene, 4-ethylidene-2-norbornene, 4-methyl-1,4-hexadiene, 5-methyl-1,4-hexadiene and the like; etc. Among the polyolefins mentioned above, copolymers of which more than 50% by weight is constituted of ethylene, propylene, butene-1, 3-methylbutene-1 or 4-methylpentene-1 and homopolymers of these monomers are preferable, and crystalline propylene type polymers such as propylene homopolymer, propylene-ethylene block or random copolymer and the like are more preferable.

Although molecular weight range of the polyolefin resin cannot be simply specified because desirable molecular weight varies with the purpose, the molecular weight is usually in the range of 0.01 to 400 g/10 minutes and preferably 0.15 to 60 g/10 minutes, as expressed in terms of melt flow rate (MFR) measured at a temperature of 230° C. under a load of 2.16 kg/cm$^2$.

The above-mentioned polyolefin resin can be produced by hitherto known methods such as polymerization or modification. Commercial products are also extensively available, and they can also be used after an appropriate selection.

When a resin composition having a more enhanced impact strength is required in this invention, it is desirable to incorporate an elastomer into the composition. Examples of said elastomer include natural rubber, polybutadiene rubber, polyisoprene rubber, butyl rubber, ethylene-propylene copolymer rubber, butadienestyrene copolymer rubber, butadiene-acrylonitrile copolymer rubber, hydrogenated and non-hydrogenated styrene-conjugated diene block copolymer rubber, polyester rubber, acrylic rubber, silicone rubber and the like and their modified products.

Among them, preferable elastomers are diene-copolymerized terpolymers, ethylene-propylene copolymer rubbers containing a graft copolymer prepared by graft copolymerizing an unsaturated monomer such as styrene and the like, and styrene-conjugated diene block copolymer rubbers such as styrene-isoprene diblock copolymer, styrene-butadiene triblock copolymer and the like including hydrogenated products thereof such as partially hydrogenated products thereof.

As used in this invention, the term "functional compound (D)" means a functional compound simultaneously having (i) non-aromatic carbon-carbon multiple bond(s), namely double bond(s) or triple bond(s), and (ii) at least one functional group selected from the group consisting of substituted carboxyl groups, substituted hydroxyl groups, substituted amino groups, substituted silyl groups, substituted mercapto groups, substituted sulfonic acid groups and oxirane groups.

As referred to herein, the term "substituted carboxyl group" means groups represented by the following formulas:

—COOR$_1$
—COX
—CONR$_2$R$_3$
—CO—Y—CO— which are all derived from a carboxyl group, wherein R$_1$ represents a hydrogen atom or an alkyl or aryl group having 1–20 carbon atoms and optionally having inactive substituent(s), X represents a halogen atom, $R_2$ and $R_3$ each represents a hydrogen atom or an alkyl or aryl group having 1-10 carbon atoms and optionally having inactive substituent(s), and Y represents oxygen atom or NH.

As referred to herein, the term "substituted hydroxyl group" means groups represented by the following general formulas:

—$OR_4$

—$\overset{\overset{O}{\|}}{O}CR_5$

—$OSi(R_6)_3$ which are all derived from a hydroxyl group, wherein $R_4$ and $R_5$ each represents a hydrogen atom or an alkyl or aryl group having 1-10 carbon atoms and optionally having inactive substituent(s), and $R_6$ in a number of 3, identical or different, each represents an alkyl, aryl or alkoxy group having 1-10 carbon atoms and optionally having inactive substituent(s).

The term "substituted amino group" means groups represented by the following general formulas:

—$NHR_7$

—$\overset{\overset{O}{\|}}{N}HCR_8$ which are all derived from an amino group, wherein $R_7$ represents a hydrogen atom, a cyano group or an alkyl or aryl group having 1-10 carbon atoms and optionally having inactive substituent(s), and $R_8$ represents a hydrogen atom or an alkyl or aryl group having 1-20 carbon atoms and optionally having inactive substituent(s).

The term "substituted silyl group" means groups represented by the following general formula:

—$Si(R_9)_3$ which are all derived from a silyl group, wherein $R_9$ in a number of 3, identical or different, each represents a hydrogen atom or an alkyl, aryl or alkoxy group having 1-10 carbon atoms and optionally having amino group(s) or mercapto group(s).

The term "substituted mercapto group" means groups represented by the following general formulas"

—$SR_{10}$

—$\overset{\overset{O}{\|}}{S}CR_{11}$ which are all derived from a mercapto group, wherein $R_{10}$ and $R_{11}$ each represents a hydrogen atom or an alkyl or aryl group having 1-10 carbon atoms and optionally having inactive substituent(s).

The term "substituted sulfonic acid group" means groups represented by the following general formulas:

—$SO_3R_{12}$
—$SO_2X$
—$SO_2NR_{13}R_{14}$ which are all derived from a sulfonic acid group, wherein $R_{12}$ represents a hydrogen atom or an alkyl or aryl group having 1-20 carbon atoms and optionally having inactive substituent(s), X represents a halogen atom, and $R_{13}$ and $R_{14}$ each represents a hydrogen atom or an alkyl or aryl group having 1-10 carbon atoms and optionally having inactive substituent(s).

Concrete examples of such a functional compound (D) include unsaturated dicarboxylic acids exemplified by maleic acid, fumaric acid, chloromaleic acid, Hymic acid, citraconic acid, itaconic acid and the like; unsaturated monocarboxylic acids exemplified by acrylic acid, butenoic acid, crotonic acid, vinylacetic acid, methacrylic acid, pentenoic acid, dodecenoic acid, linoleic acid, angelic acid, cinnamic acid and the like; acid anhydrides of the above-mentioned unsaturated dicarboxylic acids and unsaturated monocarboxylic acids exemplified by maleic anhydride, Hymic anhydride, acrylic anhydride and the like; acid amides of the above-mentioned unsaturated dicarboxylic acids and unsaturated monocarboxylic acids exemplified by maleic acid amide, maleic acid hydrazide, acrylamide, N-(hydroxymethly)-acrylamide and the like; esters of the above-mentioned unsaturated dicarboxylic acids and unsaturated monocarboxylic acids exemplified by ethyl maleate and the like; imides of the above-mentioned unsaturated dicarboxylic acids and unsaturated monocarboxylic acids exemplified by maleimide and the like; unsaturated epoxy compounds exemplified by allyl glycidyl ether, glycidyl acrylate, glycidyl methacrylate and the like; unsaturated amines exemplified by allylamine, p-aminostyrene, N-vinylaniline and the like; unsaturated alcohols exemplified by allyl alcohol, 3-buten-2-ol, propargyl alcohol and the like; alkenylphenols exemplified by p-vinylphenol, 2-propenylphenol and the like; unsaturated organosilane compounds such as 2-(3-cyclohexenyl)-ethyltrimethoxysilane, 1,3-divinyltetraethoxysilane, vinyltris-(2-methoxyethoxy)silane, 5-(bicycloheptenyl)-triethoxysilane and the like; mercapto compounds such as p-t-butylmercaptomethylstyrene and the like; and unsaturated sulfonic acids such as vinylsulfonic acid and the like. Among these functional compounds, unsaturated carboxylic acid derivatives such as maleic acid, fumaric acid, acrylic acid, methacrylic acid, maleic anhydride, Hymic anhydride and the like, and glycidyl methacrylates, glycidyl acrylate, acrylamide, maleimide, allylamine, allyl alcohol and propargyl alcohol are preferable, and the above-mentioned unsaturated carboxylic acid derivatives are more preferable. Most preferable functional compounds are maleic anhydride, Hymic anhydride and fumaric acid. Further, these compounds can be used each alone or in the form of mixture, among which a mixture of ① one or more functional compound(s) simultaneously having (i) non-aromatic carbon-carbon multiple bond(s) and (ii) one carboxyl group and ② one or more functional compound(s) or acid anhydride derivatives thereof which have (i) non-aromatic carbon-carbon multiple bond(s) and (ii) more than two caboxyl groups simultaneously is preferable, and a mixture of ① acrylic acid or methacrylic acid and ② functional compound(s) selected from the group consisting of maleic acid, maleic anhydride, fumaric acid, Hymic acid and Hymic anhydride is more preferable.

In some cases, the functional compound (D) of this invention gives a more successful result when used in combination with an alkenyl-aromatic hydrocarbon such as styrene, α-methylstyrene and the like.

The resin composition of this invention can be produced by melting and kneading the above-mentioned polyphenylene ether resin (A), the above-mentioned polyolefin resin (B) and optionally the above-mentioned elastomer (C) and the above-mentioned functional compound (D). At this time, the whole of (A), at least a part of (B) and the whole of (D) must be melted and kneaded simultaneously. As the method of melting and kneading, various hitherto known methods can be adopted. That is, the above-mentioned ingredients are mixed together by the use of known mixing means conventionally used for mixing a resin with other resin or a resin with a liquid or solid additive such as Henschel mixer, Supermixer, ribbon blender, V blender and the like to prepare a uniform mixture and thereafter the resulting mixture is kneaded by the use of a kneading means such as Banbury mixer, Plastomill, Brabender Plastograph, single or twin screw extruder and the like, for example.

Temperature of the kneading is selected from a range of 150° to 400° C. and preferably 200° to 350° C. It is sometimes preferable to carry out the kneading in the presence of a radical generator, in order to obtain a more uniform resin composition.

Examples of said radical generator include halogenated imides such as N-bromosuccinimide and the like, organic peroxides such as benzoyl peroxide, dicumyl peroxide, di-t-butyl peroxide, cumene hydroperoxide, 2,5-dimethyl-2,5-di(peroxybenzoate)-hexine-3, 1,3-bis(t-butylperoxylisopropyl)-benzene, lauroyl peroxide, t-butyl peracetate and the like, persulfates such as potassium persulfate, ammonium persulfate and the like, diazo compounds such as azobisisobutyronitrile, 1,1'-azobis(cyclohexanecarbontrile) and the like, etc.

When such a radical generator is used, its amount is usually 10 parts by weight or less and preferably 0.001 to 5 parts by weight, per 100 parts by weight of the sum of polyphenylene ether resin (A), polyolefin resin (B) and optionally elastomer (C).

In the resin composition of the invention, proportions of polyphenylene ether resin (A) and polyolefin resin (B) are not critical, but they may be arbitrarily be decided in accordance with the object or the required heat resistance, flowability, etc. Usually, however, polyphenylene ether resin (A): polyolefin resin (B) is 99:1 to 1.99 and preferably 5:95 to 80:20, as expressed in terms of percentage by weight based on the total weights of the polyphenylene ether resin and polyolefin resin.

If desired, the resin composition of this invention can contain the above-mentioned elastomer (C). Its proportion is usually 70% by weight or less and preferably 1 to 50% by weight, based on the total weights of polyphenylene ether resin (A), polyolefin resin (B) and elastomer (C).

In the resin composition of this invention, preferable range of the amount of the above-mentioned functional compound (D) cannot be simply decided, because its effect varies depending on the kind of itself, the kinds of employed polyphenylene ether resin (A) and polyolefin resin (B), and optionally elastomer (C) and their proportions. Usually, however, functional compound (D) is used in an amount of 0.1 to 30 parts by weight and preferably 0.2 to 20 parts by weight, per 100 parts by weight of the sum of polyphenylene ether resin (A), polyolefin resin (B) and optionally elastomer (C).

If desired, the resin composition of this invention may contain a wide variety of substances other than the above-mentioned ones. As examples of the "other substances" to be preferably incorporated for particularly purposes, binder, other resin, flame retardant, stabilizer, plasticizer, lubricant, pigment, reinforcing fiber, filler and the like can be referred to.

Examples of said binder include the compounds disclosed in the above-mentioned Japanese Patent Application Kokai (Laid-Open) No. 63-128056, such as diamines, dicarboxylic acids, diepoxy compounds, diols and the like; diisocyanates such as diphenylmethane diisocyanate, hexamethylene diisocyanate and the like; bisoxazolines such as 2,2'-bis (2-oxazoline) and the like; etc.

Examples of said "other resin" include poly(alkenyl aromatics) such as polystyrene, ABS resins and the like; polyamides such as nylon-6, nylon-66, nylon-12 and the like; polyamideimides; polyesters; polyacrylic esters such as polymethyl methacrylate and the like; polyvinyl halides such as polyvinyl chloride, polyvinylidene chloride and the like; etc.

Examples of the flame retardant include phosphoric esters exemplified by triphenyl phosphate, tricresyl phosphate, a phosphate obtained from a mixture of isopropylphenol and phenol, a phosphate obtained from a mixture consisting of a bifunctional phenol such as benzohydoquinone or Bisphenol A and other alcohol or phenol, and the like; brominate compounds exemplified by decabromobiphenyl, pentabromotoluene, decabromodiphenyl ether, hexabromobenzene, brominated polystyrene, brominated epoxy resin and the like; nitrogen-containing compounds such as melamine, melamine triisocyanurate and the like; and inorganic substances such as red phosphorus, antimony trioxide, boron oxide and the like.

Concrete examples of the reinforcing fiber include inorganic fibers such as glass fiber, potassium titanate fiber, rock wool, carbon fiber and the like; organic fibers such as aromatic polyamide fiber, polybenzimidazole fiber and the like; and metallic fibers such as brass fiber, aluminum-zinc fiber and the like.

Concrete examples of the filler include inorganic fillers such as glass beads, milled glass fiber, asbestos, wallastnite, mica, talc, clay, calcium carbonate, magnesium hydroxide, silica, diatomaceous earth and the like, metallic fillers such as aluminum flake, zinc flake and the like; and organic fillers such as polyimide powder and the like.

As concrete examples of the stabilizer, sterically hindered phenols, organic phosphites, oxalic acid diazides, sterically hindered amines and the like can be referred to. As concrete examples of the pigments, titanium oxide, zinc sulfide and the like can be referred to. As concrete examples of the lubricant, polyethylene wax, paraffin and the like can be referred to.

The above-mentioned "other substances" may be used at any formulation in accordance with purpose. As a rough measure in the general use, however, said other resin is used in an amount of 500 parts by weight or less, said flame retardant is used in an amount of 30 parts by weight or less and preferably 1-20 parts by weight, said stabilizer is used in an amount of 20 parts by weight or less and preferably 0.001-10 parts by weight, said reinforcing fiber and filler are used both in an amount of 100 parts by weight or less and preferably 0.1-80 parts by weight, and said lubricant is used in an amount of 2 parts of weight or less, all per 100 parts by weight of the sum of polyphenylene ether resin (A), polyolefin resin (B) and optionally elastomer (C).

Next, this invention will be illustrated in more detail by way of the following examples. This invention is by no means limited by these examples.

In the examples, tensile elongation and Izod impact strength (notched) were measured at 23° C. according to ASTM D638 and ASTM D256 on test pieces having a thickness of 3.2 mm prepared by injection molding, and heat distortion temperature (HDT) under load was measured according to ASTM D648 under a load of 4.6 kg/cm$^2$.

Intrinsic viscosity of polyphenylene ether resin was measured with Ubbelohde viscometer in chloroform at 30° C.

EXAMPLES 1–8 AND COMPARATIVE EXAMPLES 1–2

By the use of Supermixer, 30 parts by weight of poly(2,6-dimethyl-1,4-phenylene ether) having an intrinsic viscosity of 0.46 dl/g (PPE H-46, manufactured by Nippon Polyether Co.), 70 parts by weight of polypropylene having MFR of 0.4 g/10 minutes (Sumitomo Noblen D501, manufactured by Sumitomo Chemical Co., Ltd.), 2 parts by weight of styrene, 1.2 parts by weight of a radical generator composition prepared by dispersing 1,3-bis(t-butylperoxyisopropyl)-benzene in polypropylene up to a concentration of 8% by weight, and the elastomer and functional compound shown in Table 1, of which amounts (parts by weight) were as shown in Table 1, were mixed together.

The mixture thus prepared was melted and kneaded by the use of a 50 mm twin screw extruder (TEM-50, manufactured by Toshiba Kikai K. K.) equipped with the first feeder, the first kneading zone, the second feeder, the second kneading zone, a vent and a cylinder head in the mentioned order from the upstream to the downstream, at a barrel temperature of 260° C. while continuously feeding it into the first feeder. Thus, a resin composition of this invention was obtained.

Izod impact strength of the resin composition is shown in Table 1.

In Example 5, HDT of the resin composition was as high as 138° C.

REFERENTIAL EXAMPLE 1

The same poly(2,6-dimethyl-1,4-phenylene ether) as in Example 1, maleic anhydride, styrene and a radical generator composition, in respective amounts of 100, 1, 2 and 1 parts by weight, were mixed together by the use of Supermixer, and the resulting mixture was extruded by the use of the same twin screw kneading extruder as in Example 1 at a barrel temperature of 300° C. The extruded strand was pelletized to obtain a pelletized composition. It was named preliminary kneaded mixture M-1.

REFERENTIAL EXAMPLE 2

By the use of Supermixer, the same polypropylene as in Example 1, maleic anhydride, stryene and radical generator composition, in respective amounts of 100, 1, 2 and 1 parts by weight, were mixed together. The mixture thus obtained was extruded by the use of the twin screw kneading extruder of Example 1 at a barrel temperature of 230° C., and the extruded strand was pelletized to obtain a pelletized composition. It was named preliminary kneaded mixture M-2.

COMPARATIVE EXAMPLE 3

Forty parts by weight of the preliminary kneaded mixture M-1 and 60 parts by weight of the preliminary kneaded mixture M-2, both obtained in the above-mentioned referential examples, were extruded by the use of the twin screw kneading extruder of Example 1 at a barrel temperature of 260° C. The extruded strand was pelletized to obtain a resin composition.

Izod impact strength of the resin composition was 1.1 kg.cm/cm.

COMPARATIVE EXAMPLE 4

Forty parts by weight of the preliminary kneaded mixture M-1 obtained in the above-mentioned Referential Example 1 and 60 parts by weight of the same polypropylene as in Example 1 were extruded in the same manner as in Comparative Example 3 to prepare a resin composition.

Izod impact strength of the resin composition was 1.4 kg.cm/cm.

COMPARATIVE EXAMPLE 5

Forty parts by weight of the same poly(2,6-dimethyl-1,4-phenylene ether) as in Example 1 and 60 parts by weight of the preliminary kneaded mixture M-2 obtained in the above-mentioned Referential Example 2 were extruded in the same manner as in Comparative Example 3 to prepare a resin composition.

Izod impact strength of the resin composition was 0.9 kg.cm/cm.

Owing to its excellent impact resistance and economicity, the resin composition of this invention obtained in the above-mentioned manner is formed by various forming processes such as extrusion, injection molding, blow molding, etc., and supplied to society as a variety of useful resin articles. Accordingly, the industrial value of this invention is very great.

TABLE 1

| | Elastomer | | Functional compound | | Tensile elongation | Izod impact strength |
|---|---|---|---|---|---|---|
| No. | Name | Parts by wt. | Name | Parts by wt. | (%) | (kg · cm/cm) |
| Example 1 | — | — | Maleic anhydride | 1.0 | 9 | 3.3 |
| Example 2 | — | — | Hymic anhydride | 2.0 | 8 | 3.1 |
| Example 3 | — | — | Fumaric acid | 1.2 | 6 | 2.8 |
| Example 4 | — | — | Acrylic acid | 2.0 | 4 | 2.6 |
| Example 5 | EPR[a)] | 33.3 | Fumaric acid | 1.8 | 110 | 7.0 |

TABLE 1-continued

| No. | Elastomer Name | Parts by wt. | Functional compound Name | Parts by wt. | Tensile elongation (%) | Izod impact strength (kg · cm/cm) |
|---|---|---|---|---|---|---|
| Example 6 | EPR[a] | 33.3 | Maleic anhydride | 1.5 | 135 | 8.2 |
| Example 7 | SEP[b] | 12 | Maleic anhydride | 1.5 | 13 | 17 |
| Example 8 | SEBS[c] | 12 | Maleic anhydride | 1.5 | 25 | 22 |
| Comparative Example 1 | — | — | — | — | 2 | 1.3 |
| Comparative Example 2 | EPR[a] | 33.3 | — | — | 5 | 3.0 |

Notes)
[a] Ethylene-propylene rubber (propylene content = 27% by wt., Mooney viscosity at 121° C. = 33)
[b] Partially hydrogenated styrene-isoprene block copolymer (Kraton G-1701, manufactured by Shell Chemical Co., Ltd.)
[c] Partially hydrogenated styrene-butadiene-styrene block copolymer (Kraton G-1650, manufactured by Shell Chemical Co., Ltd.)

EXAMPLE 9

The procedure of Example 6 was repeated, except that 2 parts by weight of styrene was replaced with 1 part by weight of methacrylic acid. Thus, a resin composition of the invention was obtained.

Tensile elongation and Izod impact strength of the composition were 205% and 7.2 kg.cm/cm, respectively.

What is claimed is:

1. A resin composition prepared by melting and kneading simultaneously (A) a polyphenylene ether resin, (B) a polyolefin resin and (D) a functional compound simultaneously having (i) non-aromatic carbon-carbon multiple bond(s) and (ii) at least one functional group selected form the group consisting of substituted carboxyl groups, substituted hydroxyl groups, substituted amino groups, substituted silyl groups, substituted mercapto groups, substituted sulfonic acid groups and oxirane groups, in the presence of a radical generator added in an amount of 10 parts by weight or less per 100 parts by weight of the sum of polyphenylene ether resin (A), polyolefin resin (B) and optionally elastomer (C).

2. A resin composition prepared by melting and kneading simultaneously (A) a polyphenylene ether resin, (B) a polyolefin resin, (C) an elastomer and (D) a functional compound simultaneously having (i) non-aromatic carbon-carbon multiple bond(s) and (ii) at least one functional group selected from the group consisting of substituted carboxyl groups, substituted hydroxyl groups, substituted amino groups, substituted silyl groups, substituted mercapto groups, substituted sulfonic acid groups and oxirane groups, in the presence of a radical generator added in an amount of 10 parts by weight or less per 100 parts by weight of the sum of polyphenylene ether resin (A), polyolefin resin (B) and optionally elastomer (C).

3. A resin composition according to claim 1 or 2, wherein the polyphenylene ether resin (A) is poly(2,6-dimethyl-1,4-phenylene ether) or a 2,6-dimethyl-phenol/2,3,6-trimethylphenol copolymer.

4. A resin composition according to claim 1 or 2, wherein a molecular weight of the polyphenylene ether resin (A) is 0.1 to 0.7 dl/g as expressed in terms of intrinsic viscosity measured in chloroform at 30° C.

5. A resin composition according to claim 1 or 2, wherein the polyolefin resin (B) is a copolymer of which more than 50% by weight is constituted of ethylene, propylene, butene-1, 3-methylbutene-1 or 4-methylpentene-1 or a homopolymer of ethylene, propylene, butene-1, 3-methylbutene-1 or 4-methyl-pentne-1.

6. A resin composition according to claim 1 or 2, wherein a molecular weight of the polyolefin resin (B) is 0.01 to 400 g/10 minutes as expressed in terms of melt flow rate (MFR) measured at a temperature of 230° C. under a load of 2.16 kg/cm$^2$.

7. A resin composition according to claim 1 or 2, wherein the functional compound (D) is maleic acid, fumaric acid, acrylic acid, methacrylic acid, maleic anhydride, Hymic anhydride, glycidyl methacrylate, glycidyl acrylate, acrylamide, maleimide, allylamine, ally alcohol or propargyl alcohol.

8. A resin composition according to claim 2, wherein the elastomer (C) is natural rubber, polybutadiene rubber, butyl rubber, ethylene-propylene copolymer rubber, butadiene-styrene copolymer rubber, butadiene-acrylonitrile copolymer rubber, hydrogenated or non-hydrogenated styrene-conjugated diene block copolymer rubber, polyester rubber, acrylic rubber or silicone rubber.

9. A resin composition according to claim 1 or 2, wherein a proportion of the polyphenylene ether resin (A) and the polyolefin resin (B) is 99:1 to 1:99 as expressed in terms of percentage by weight based on the total weight of the polyphenylene ether resin and polyolefin resin.

10. A resin composition according to claim 1 or 2, wherein a proportion of the functional compound (D) is in an amount of 0.1 to 30 parts by weight per 100 parts by weight of the sum of the polyphenylene ether resin (A) and the polyolefin resin (B) or the sum of the (A), (B) and optionally the elastomer (C).

11. A resin composition according to claim 2, wherein a proportion of the elastomer (C) is 70% by weight or less based on the total weight of the polyphenylene ether resin (A), the polyolefin resin (B) and the elastomer (C).

12. A resin composition according to claim 1 or 2, wherein the composition contains at least one member selected from the group consisting of binder, other resin, flame retardant, stabilizer, plasticizer, lubricant, pigment, reinforcing fiber and filler.

13. A resin composition according to claim 1 or 2, wherein the melting and kneading are carried out at a temperature of 150° to 400° C.

14. A process for producing a resin composition which comprises melting and kneading simultaneously (A) a polyphenylene ether resin, (B) a polyolefin resin and (D) a functional composition simultaneously having (i) non-aromatic carbon-carbon multiple bond(s) and (ii) at least one functional group selected from the group selected form the group consisting of substituted carboxyl groups, substituted hydroxyl groups, substituted amino groups, substituted silyl groups, substituted mercapto groups, substituted sulfonic acid groups and oxirane groups, in the presence of a radical generator.

15. A process for producing a resin composition which comprises melting and kneading simultaneously (A) a polyphenylene ether resin, (B) a polyolefin resin, (C) an elastomer and (D) a functional compound simultaneously having (i) non-aromatic carbon-carbon multiple bond(s) and (ii) at least one functional group selected from the group consisting of substituted carboxyl groups, substituted hydroxyl groups, substituted amino groups, substituted silyl groups, substituted mercapto groups, substituted sulfonic acid groups and oxirane groups, in the presence of a radical generator.

16. A process according to claim 14 or 15 wherein the melting and kneading are carried out at a temperature of 150° to 400° C.

17. A resin composition according to claim 2, wherein the elastomer (C) is polyisoprene rubber.

* * * * *